United States Patent
Ersoy et al.

(10) Patent No.: US 6,305,075 B1
(45) Date of Patent: *Oct. 23, 2001

(54) MOTOR VEHICLE TRANSMISSION SHIFTING DEVICE WITH A CURVED PRINTED CIRCUIT BOARD AND PROCESS FOR MANUFACTURING THE PRINTED CIRCUIT BOARD

(75) Inventors: Metin Ersoy, Walluf; Hans-Joseph Gassmann, Meerbeck, both of (DE)

(73) Assignee: Lemforder Metallwaren AG, Stemwede-Dielingen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/487,518

(22) Filed: Jan. 19, 2000

Related U.S. Application Data

(62) Division of application No. 08/982,108, filed on Dec. 1, 1997, now Pat. No. 6,155,128.

(30) Foreign Application Priority Data

Dec. 4, 1996 (DE) ................................. 196 50 154

(51) Int. Cl.$^7$ ................................................ H05K 7/02
(52) U.S. Cl. .......................................... 29/829; 198/345.3
(58) Field of Search ............................. 29/829, 840, 832, 29/825; 228/179, 189, 180; 198/345.3, 345.1

(56) References Cited

U.S. PATENT DOCUMENTS

| | | | |
|---|---|---|---|
| 4,528,748 | * 7/1985 | Eichelberger et al. | 29/835 |
| 4,560,844 | * 12/1985 | Takamura et al. | 200/5 |
| 4,673,967 | * 6/1987 | Hingorany | 357/70 |
| 5,037,315 | * 8/1991 | Collier et al. | 439/83 |
| 5,548,090 | * 8/1996 | Harris | 174/252 |
| 5,722,527 | * 3/1998 | Van Gastel et al. | 198/345.3 |
| 5,736,680 | * 4/1998 | Caldwell et al. | 174/250 |
| 5,748,448 | * 5/1998 | Hokari | 361/749 |

* cited by examiner

*Primary Examiner*—Steven Sax
(74) *Attorney, Agent, or Firm*—McGlew and Tuttle, P.C.

(57) ABSTRACT

A shifting device for the transmission of a motor vehicle with a curved printed circuit board inserted under the curved cover and to a process for preparing this curved printed circuit board with the components inserted. The shifting movements performed at the gearshift lever of the shifting device are electronically transmitted to the transmission. The components are inserted according to the present invention on a rigid printed circuit board in the flat state and the printed circuit board is soldered in the curved state, wherein the printed circuit board, consisting of glass fiber-reinforced epoxy resin, remains in this curved state after cooling due to its inner structure.

24 Claims, 5 Drawing Sheets

MOTOR VEHICLE TRANSMISSION SHIFTING DEVICE WITH A CURVED PRINTED CIRCUIT BOARD AND PROCESS FOR MANUFACTURING THE PRINTED CIRCUIT BOARD

This is a Divisional of application Ser. No. 08/982,108 filed Dec. 1, 1997, and the entire disclosure of this prior application is considered to be part of the disclosure of the accompanying application and is hereby incorporated by reference therein U.S. Pat. No. 6,155,128.

FIELD OF THE INVENTION

The present invention pertains to a shifting device for the transmission of a motor vehicle with a curved printed circuit board inserted under the curved cover and to a process for manufacturing this curved printed circuit board with inserted components.

BACKGROUND OF THE INVENTION

The shifting movements performed at the gearshift lever of the shifting device may be electronically transmitted to the transmission.

Shifting devices whose gearshift lever passes through a cover, at which the shift positions are optically displayed, have been known. The existing shift position symbols are usually illuminated permanently, and the corresponding symbol is illuminated more strongly in order to show to the driver of the vehicle which gear has been selected.

Such a shift position display is disclosed in, e.g., DE 296 06 501.3. Fatigue phenomena occur in the cables moved along with the gearshift lever, and the illumination of the shift position symbols is not perfectly homogeneous.

Shifting devices which transmit a signal corresponding to the shift position of the gearshift lever to a control unit of the transmission via sensors have been known, e.g., from DE 196 08 981.6. The function of detecting the signal, of coding, of processing and of transmitting are carried out at different points of the shifting, and the signals are transmitted via cables, plugs and additional elements. This design is error-prone and cost-intensive because of the many interfaces.

Printed circuit boards which can be assigned to one of two groups are currently known in the state of the art. Distinction is made between flexible printed circuit boards and rigid printed circuit boards.

Flexible printed circuit boards are difficult to handle because of the flexibility of the material of the printed circuit board during the insertion of components and mounting, and their dimensional stability is insufficient in the particular case. They are very expensive and are therefore unacceptable in the automobile industry because of the large numbers needed.

Rigid printed circuit boards are less expensive than flexible printed circuit boards and can be processed in a simpler manner.

They have a flat surface shape and can be provided with conductor strips on the top side and the underside. The components are inserted on these printed circuit boards in the flat state, soldered, and cooled after soldering.

So-called SMD (surface mounted devices) components have already proved successful for insertion on the printed circuit boards. These are components that are placed on the surface.

They require no holes in the printed circuit board any more to position and insert them, but they are placed on the solder paste applied to the printed circuit board beforehand by screen printing and are held in the position into which they are brought by an automatic inserting unit by the adhesive forces of the solder paste until the final soldering.

Printed circuit boards may be through hole plated, i.e., they may have conductor strips on both sides of the printed circuit board, wherein the conductor strips are connected to one another at desired points by the conductor strips having through holes, which pass through the corresponding conductor strips to be connected and the printed circuit board, wherein this hole is lined with conductive material in order to establish the conductive connections between the perforated conductor strips to be connected. These rigid, flat printed circuit boards are installed in the flat state.

It is disadvantageous that a rigid printed circuit board cannot be bent later, i.e., after the components have already been inserted and it has been soldered, in order to adapt it, e.g., to a desired mounting situation, which would require a curved printed circuit board.

Even though a rigid printed circuit board is flexible to some extent, this flexibility is not sufficient to impart a permanent curvature to the printed circuit board; stresses, which would be transmitted to the conductor strips and to the terminals of the components, are generated in the material during the subsequent bending of the printed circuit board after soldering and the complete insertion of the components. A printed circuit board thus bent would display stresses in its material and could not withstand the loads occurring in the vehicle due to the prevailing operating conditions, such as vibrations, variations in temperature, etc.; the stress load of the components would unavoidably lead to preprogrammed failure of the printed circuit boards, the components or both together.

For example, small glow lamps, light-emitting diodes, etc., which are installed on flat printed circuit boards and are used to illuminate the shift position symbols, may be located under the cover of shifting devices, which usually have a bent or curved surface contour in order to optically better harmonize with the pivoting movement of the gearshift lever. However, problems linked with the gaping of the contour of the cover of the shifting device and the contour of the installed printed circuit board keep occurring in this case; e.g., the distance between the illuminating means and the symbols to be illuminated is not equal, which may lead to an undesired difference in the intensity of the illumination.

SUMMARY AND OBJECTS OF THE INVENTION

The primary object of the present invention is to provide a shifting device that has no cables and connectors moving along with the gearshift lever, requires a minimum number of components and makes possible an optimal illumination of the shift position symbols.

This object is accomplished according to the present invention by the shifting device having a curved printed circuit board, which is adapted to the curvature of the cover of the shifting device and accommodates all the necessary electronic components of a circuit, e.g., sensors, light-emitting diodes and processors on this one printed circuit board.

The shifting device according to the present invention has a curved printed circuit board, which is optimally adapted to the curvature of the cover of the shifting device and is mounted at a short distance of less than 10 mm under the cover of the shifting device. It may be locked, e.g., in a transparent plastic plate, which may be provided with the shift position symbols. In addition, space can be saved in the shifting device due to the compact design, and the weight can be reduced.

Due to the curvature of the printed circuit board being substantially exactly adapted to the curvature of the cover of the shifting device, it can be achieved that a homogeneous, diffuse illumination of the individual shift position symbols can be seen on the curved cover of the shifting device. This advantage results from the distance between the light-emitting diodes installed on the printed circuit board and the shift position symbols being substantially constant.

All the electronic components that are necessary for the detection of the position of the gearshift lever and for the illumination of the shift position symbols are installed in this one printed circuit board. At least one activating element, e.g., a magnet, is carried by the gearshift lever. During the selection of the gears, the magnet is moved along the sensors installed on the printed circuit board, and it induces in them a signal, which can be subjected to further processing in a processor. The activating elements corresponding to the sensors may be installed directly at the gearshift lever or be preferably arranged at a blind-type cover of the shifting device, which is carried by the gearshift lever during the movement.

The sensors are preferably installed such that they pass through the printed circuit board, i.e., the printed circuit board has openings at these points, i.e., holes, via which or in which the sensors can be installed. The electronic components are installed on one side of the printed circuit board, called the top side. At least one activating element is carried by the pivoting of the gearshift lever and is moved along the sensors, which pass through the printed circuit board to the other side, the underside of the printed circuit board. An electric signal is generated via the sensors, and this signal is processed in a processor installed on the printed circuit board and is electronically transmitted as a control signal to the transmission.

A prior-art rigid, flat printed circuit board is used to manufacture the curved printed circuit board according to the present invention. This may consist of, e.g., glass fiber-reinforced epoxy resin. Other support materials are also within the range of the object of the present invention. The conductor strips are prepared in the known manner and necessary through hole plating is optionally performed. Material is removed from the printed circuit board for the intended holes or openings. The solder paste is then exactly applied by means of the screen printing process to the areas on which the components with their soldered terminals shall be subsequently placed.

The intended components are subsequently inserted on the flat, rigid printed circuit board in an automatic insertion unit. SMD components are preferably used. These electronic components are placed exactly on the solder paste dots previously applied and are fixed in their intended places by the adhesive forces of the solder paste even before the final soldering.

The printed circuit board prepared for the soldering, with the components inserted, is clamped in the next step in a mount, e.g., a frame, which imparts a desired curvature to it. The now curved printed circuit board is introduced in this frame into a soldering furnace, in which the soldering is performed.

After the soldering process has been concluded and the cooled, curved printed circuit board has been removed from the frame, the printed circuit board retains its curved state, because the epoxy resin of the printed circuit board, which, though having softened during the soldering process, but having again solidified after the cooling, maintains the incorporated glass fibers of the printed circuit board in the curved state.

Curved printed circuit boards manufactured according to the present invention, with the components inserted, may also be assembled in a three-dimensional array. Flat or curved, rigid or flexible printed circuit boards may be additionally soldered or otherwise connected to them to make it also possible to prepare complicated printed circuit board configurations in order to fit printed circuit boards into tight spaces.

A supplementary printed circuit board, with the components inserted in it, is soldered according to the present invention to an already curved printed circuit board. However, it is also possible and within the scope of the present invention to perform this step simultaneously with the rest of the soldering process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
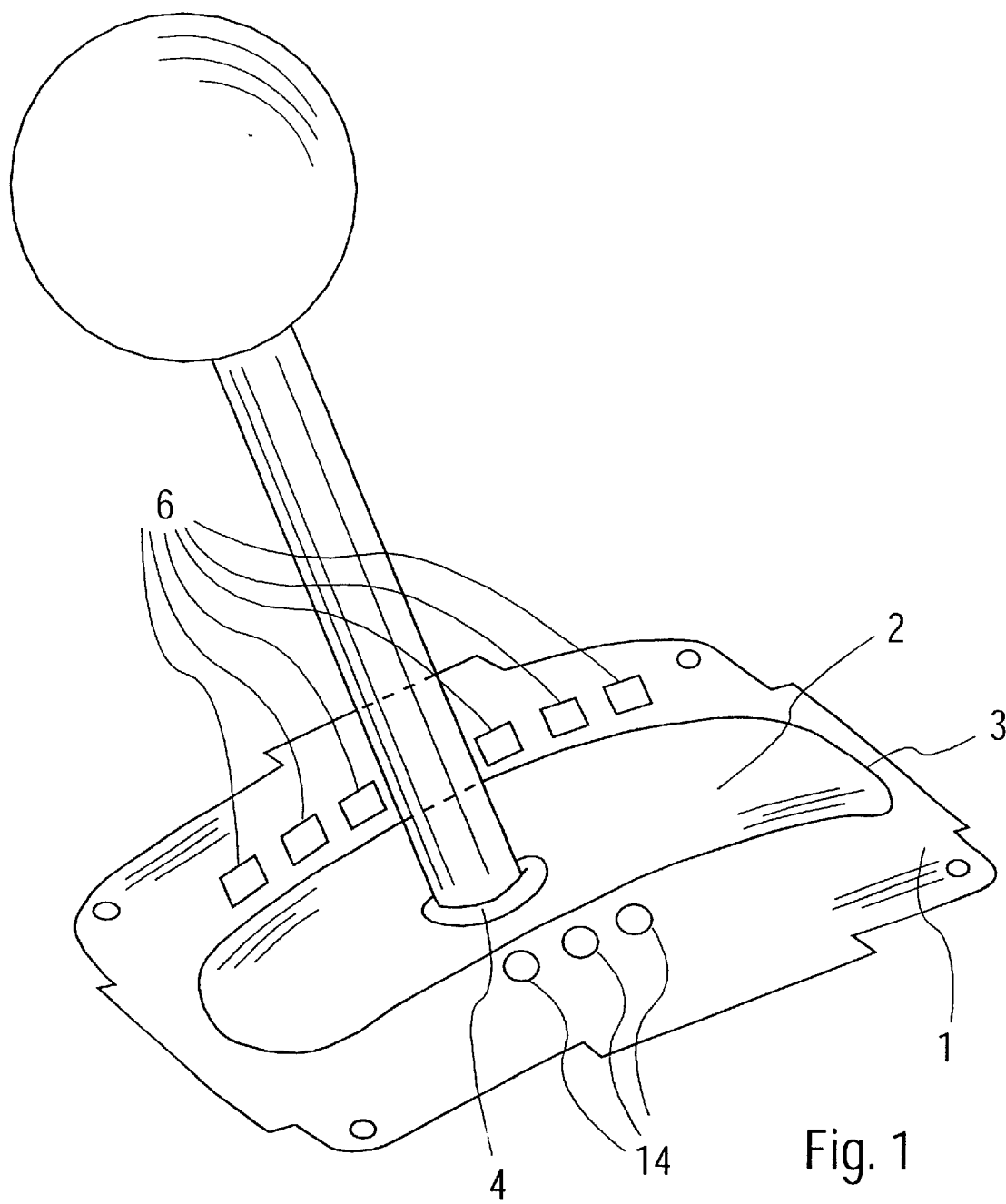
FIG. 1 is a perspective view of a curved printed circuit board for automatic shifting with subjacent blind-type cover.
Figure 1A:
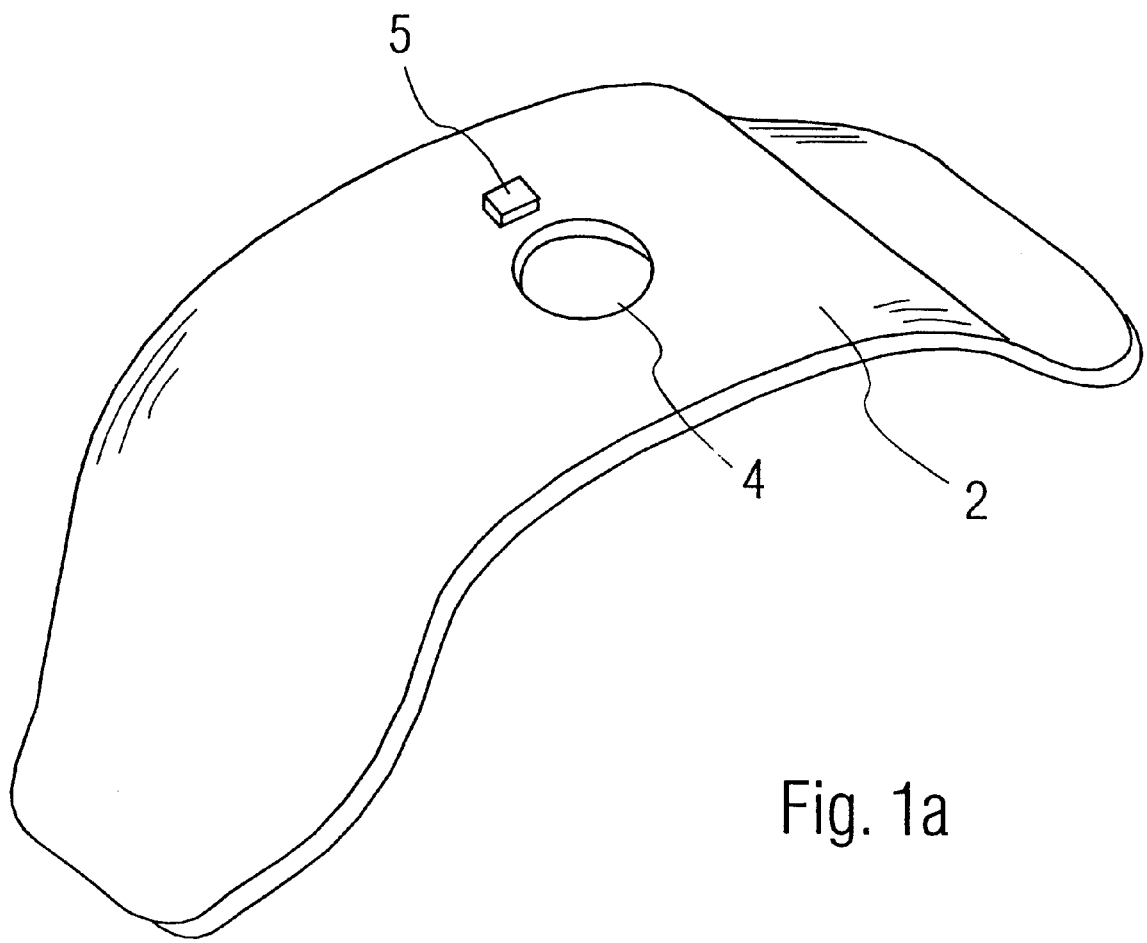
FIG. 1a is a detailed representational perspective view of the blind-type cover from FIG. 1 with integrated magnets as the activating elements of the sensors.

Referring to the drawings in particular, FIG. 1 shows a curved printed circuit board 1 with the components inserted for an automatic shifting device with a subjacent blind-type cover 2. A gearshift lever passes through the curved printed circuit board 1 through an opening 3 and at the same time the blind-type cover 2 in an aperture 4. As is apparent from FIG. 1a, a magnet 5 is integrated as an activating element in the blind-type cover 2. The gearshift lever is guided in the opening 3 of the curved printed circuit board 1 during the pivoting of the gearshift lever in the automatic shift gate, and it carries the blind-type cover 2 with it, because it passes through the blind-type cover in the aperture 4. The magnet 5 is moved along under the sensors 6. The magnet 5 is used as an activating element for the sensors 6 installed on the curved printed circuit board 1. Depending on the shift position occupied by the gearshift lever, different sensors 6 are activated by the magnet 5. The signals generated are processed in a processor installed on the curved printed circuit board 1 and are transmitted as corresponding electric signals to the gearbox and to the shift position display.

According to the present invention, solder paste is applied to the printed circuit board 1 in the flat state by means of a screen printer and a template. In the next step, the printed circuit board I is introduced into an automatic insertion unit, which places the surface-mountable electronic SMD components exactly on the intended places according to a preset program. The SMD components quasi float on the solder, because they are held on the solder by the adhesive forces of the solder paste.

In the next step, the printed circuit board 1 with the components mounted is clamped in a frame acting as a mount, which imparts a predetermined curvature to it. The printed circuit board is introduced with the frame into a soldering unit. The melting point is about 210–215° C. here, so that the solder will melt, but the SMD components, which themselves can be exposed to temperatures of up to about 280° C., are not damaged and do not float away on the solder.

The temperature of the epoxy resin interspersed with glass fibers in the printed circuit board increases during the soldering process and softens and passes it over into a plastic state.

The epoxy resin of the printed circuit board 1, which is interspersed with glass fibers, solidifies in the curved state predetermined by the frame during the phase of cooling.

The printed circuit board 1 removed from the frame remains in the curved state, because the epoxy resin maintains the incorporated glass fibers in the curved state during the solidification of the printed circuit board 1.

A plurality of printed circuit boards may be subjected to the above-described process next to each other, depending on how large the available unit is.

A through-hole-plated, curved printed circuit board with inserted components is used for the shifting device according to the present invention, but configurations that have a plurality of curved printed circuit boards next to one another and/or one on top of another are also conceivable in other fields of application.

Figure 1B:
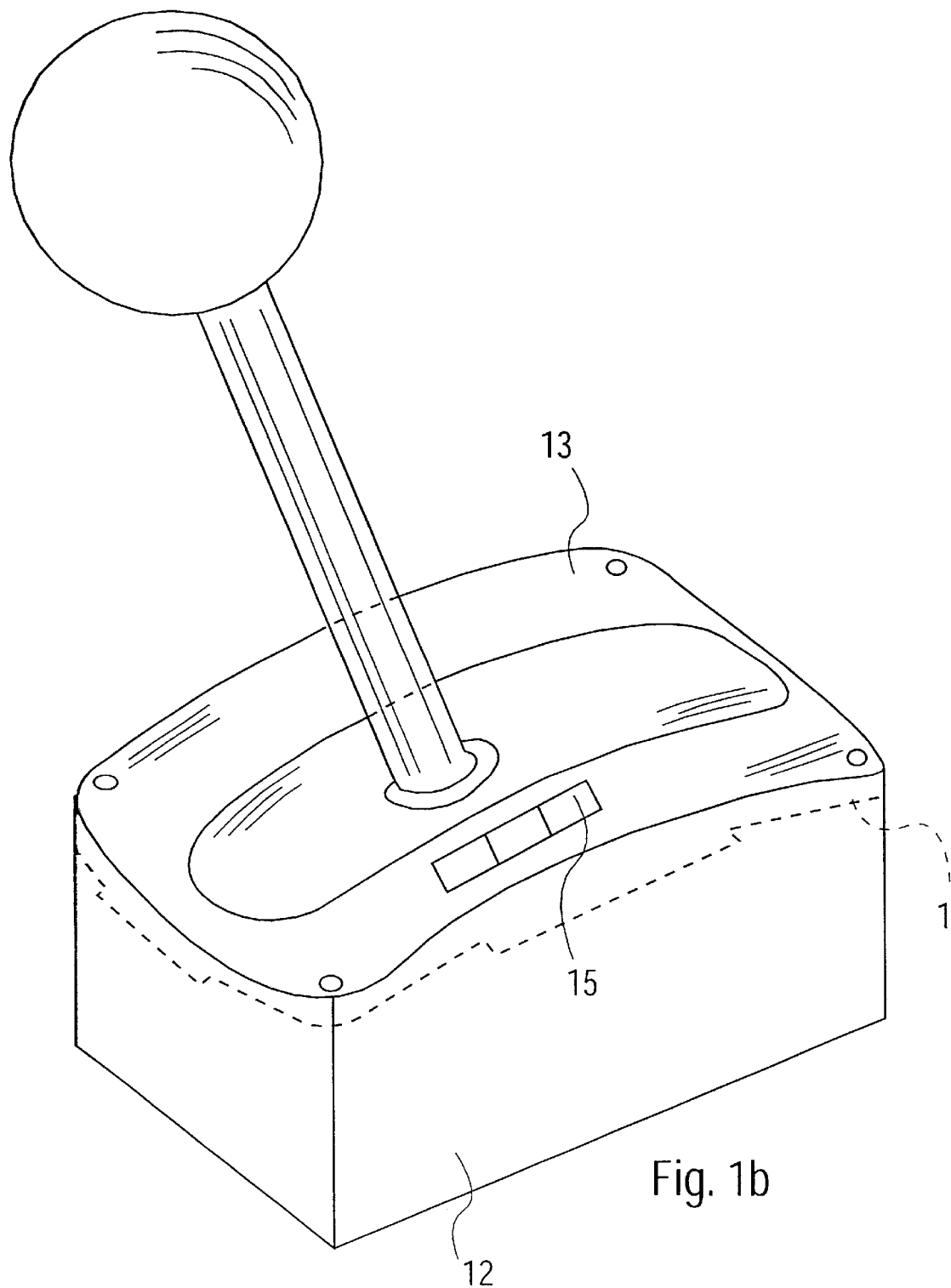
FIG. 1b is a perspective view of the shifting device.

FIG. 1b shows how the printed circuit board 1 is positioned in the housing 12 adjacent, and having a curve conforming, to the curve of cover 13. Light emitting diodes 14 on the printed circuit board 1 are selectively covered dependent on the status of the sensors 6 and illuminate the symbols 15 on the cover 13.

Figure 2:
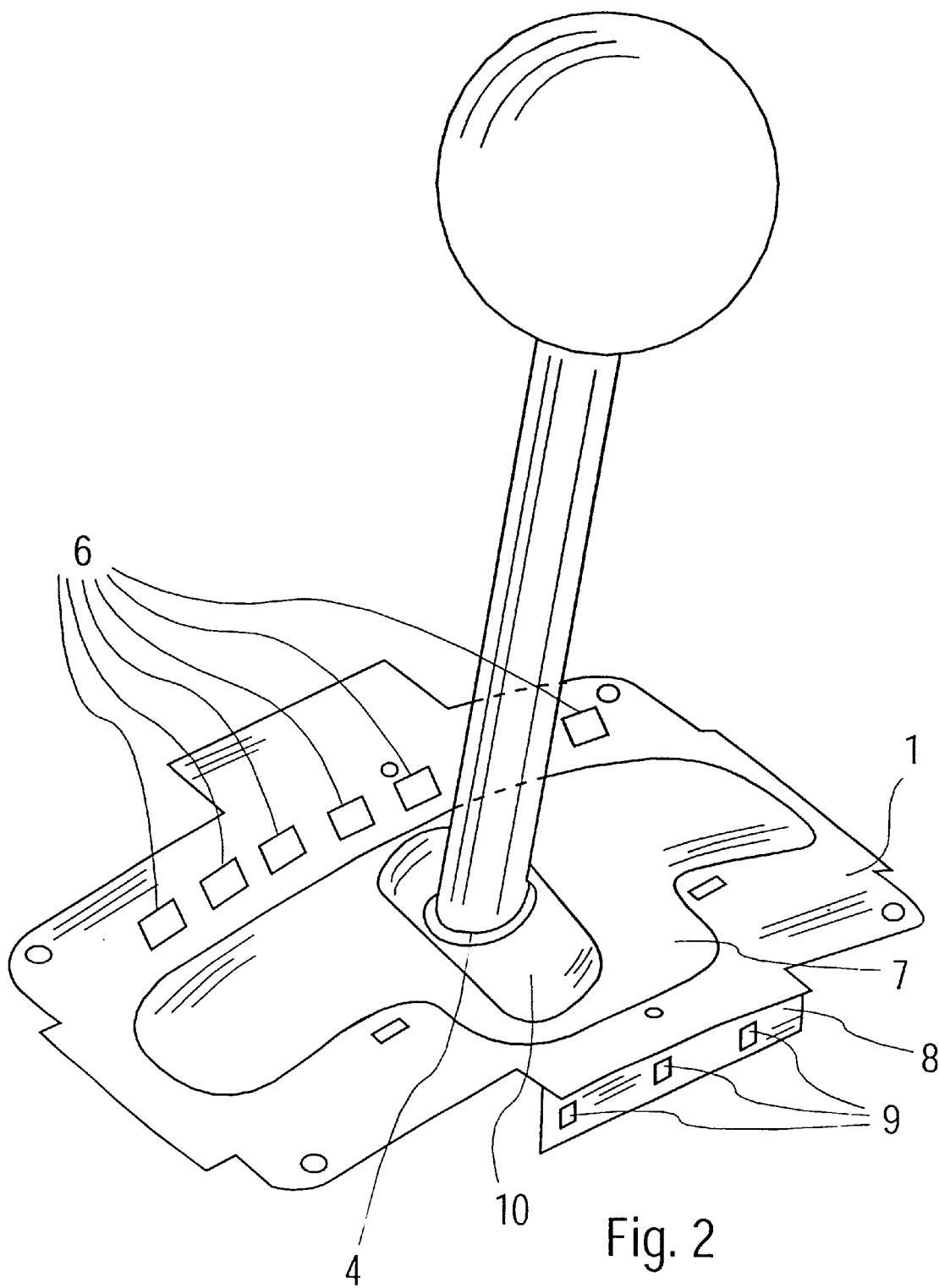
FIG. 2 is a perspective view of a curved printed circuit board with supplementary printed circuit board for automatic shifting with tipping gate.
Figure 2A:
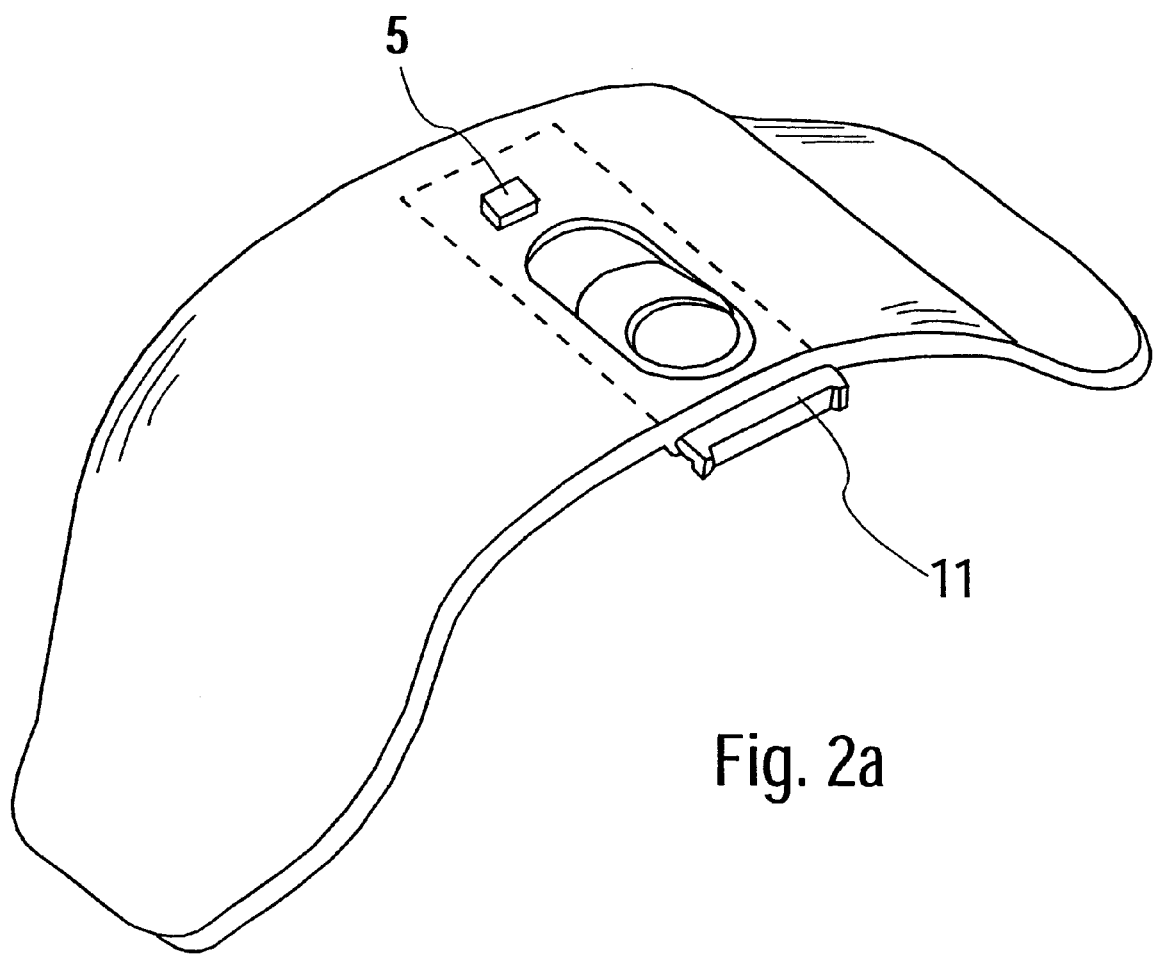
FIG. 2a is a detailed representational perspective view of the blind-type cover from FIG. 2 with integrated magnets as activating elements of the sensors.

A curved printed circuit board 1 shown in FIG. 2 is prepared according to the same process as was described above.

The curved printed circuit board 1 shown in FIG. 2 is intended for an automatic shifting device with tipping gate and has an opening 7, into which the gearshift lever is pivoted during the tipping movement (at right angles to the direction of travel) and in which the tipping movement (in the direction of travel) is performed.

This curved printed circuit board 1 is provided with a flat supplementary printed circuit board 8 with inserted components, which is soldered according to the present invention to the already curved printed circuit board 1 in another step. The supplementary printed circuit board 8 is equipped with sensors 9. A slat area 10 of the blind-type cover 2 with an aperture 4 for the gearshift lever has an additional activating element, mainly a magnet 11, next to the magnet 5 installed as an activating element at the blind-type cover 2, the magnet 11 being arranged at the slat area 10 such that it is moved along the sensors 9 during the movement of the gearshift lever in the tipping gate (in the direction of travel), and it generates in these sensors a corresponding signal, which is subjected to further processing and is transmitted as an electric signal to both the transmission control and the shift position display.

When the gearshift lever is again pivoted from the tipping gate into the automatic gate (at right angles to the direction of travel), the magnet 11, which is arranged at the slat area 10, is moved out of the detection range of the sensors 9. The magnet 5 again becomes active to register the shifting movements of the driver of the vehicle (in the direction of travel) in the automatic shift gate.

A shifting device that requires a minimum number of components, makes possible an optimal illumination of the shift position symbols and has no cables and connectors moved along with the gearshift lever is provided according to the present invention. The connection between the shifting device and the rest of the electronic system of the vehicle is established via a plug-type connector soldered to the curved printed circuit board.

The optimal illumination is achieved by a curved printed circuit board, on which the components are inserted in the flat state and which is soldered in the curved state and remains in this curved state after cooling because of its inner structure.

While specific embodiments of the invention have been shown and described in detail to illustrate the application of the principles of the invention, it will be understood that the invention may be embodied otherwise without departing from such principles.

What is claimed is:

1. A process for manufacturing a curved printed circuit board, comprising the steps of:

applying solder to a rigid, thermoplastically deformable printed circuit board, provided with conductor strips, in a flat state;

subsequently positioning components on the printed circuit board;

clamping the printed circuit board with the components inserted in a frame in a curved state to impart a predetermined curvature to said printed circuit board whereby the printed circuit board conforms to the shape of the frame;

heating the clamped circuit board to a soldering temperature in a soldering furnace, and cooling the printed circuit board to its solidification point.

2. A process for manufacturing a curved printed circuit board, the process comprising the steps of:

providing a thermoplastically deformable printed circuit board in a flat state, said printed circuit board having a solidification point;

applying solder to said printed circuit board in said flat state;

positioning components on said solder on said printed circuit board in said flat state;

clamping said printed circuit board with said components inserted in a frame into a curved state to impart a predetermined curvature to said printed circuit board whereby the printed circuit board conforms to the shape of the frame;

heating said clamped printed circuit board to a soldering temperature;

cooling said clamped printed circuit board to said solidification point.

3. The process in accordance with claim 2, further comprising:

operating said printed circuit board at temperatures below said solidification point.

4. The process in accordance with claim 2, wherein:
said soldering temperature is above said solidification point.

5. The process in accordance with claim 2, wherein:
said printed circuit board is formed of a material undergoing stress during said clamping into said curved state, said material removing said stress during said heating.

6. The process in accordance with claim 5, wherein:
said material is glass fiber-reinforced epoxy resin.

7. The process in accordance with claim 5, wherein:
said material softens at said soldering temperature.

8. The process in accordance with claim 6, wherein:
said material softens at said soldering temperature and maintains said glass fiber in said curved state below said solidification point.

9. The process in accordance with claim 2, further comprising:
inserting said printed circuit board in said curved state adjacent a cover of a shifting device.

10. The process in accordance with claim 2, wherein:
said curved state is transversely curved into a U-shaped configuration.

11. The process according to claim 1, wherein:
said clamping rigidly holds said printed circuit board in the mount.

12. The process according to claim 2, wherein:
said clamping rigidly holds said printed circuit board in the mount.

13. A manufacturing process comprising the steps of:
providing a thermoplastically deformable printed circuit board in a flat state, the printed circuit board being provided with conductor strips;
applying solder to the rigid thermoplastically deformable printed circuit board in the flat state;
positioning components on the printed circuit board;
providing a frame having a curved surface providing a predetermined curvature;
clamping the printed circuit board, with the components inserted, to the frame to impart the predetermined curvature to said printed circuit board whereby the printed circuit board conforms to the shape of the frame;
heating the clamped circuit board to a soldering temperature in a soldering furnace to thermoplastically deform said printed circuit board; and
cooling the printed circuit board to its solidification point whereby said printed circuit board maintains said predetermined curvature.

14. The process in accordance with claim 13, further comprising:
said soldering temperature is above said solidification point wherein said material softens at said soldering temperature.

15. The process in accordance with claim 13, wherein:
said printed circuit board is formed of a material undergoing stress during said clamping into said curved state, said stress being removed from said material during said heating.

16. The process, in accordance with claim 13, wherein:
said material is glass fiber-reinforced epoxy resin.

17. The process in accordance with claim 13, further comprising:

providing a blind cover and a movable shifter rod of a shifting device, said blind cover being movable with said shifter rod;
inserting said printed circuit board in said curved state adjacent said blind cover of a shifting device.

18. The process in accordance with claim 17, further comprising:
providing an activating element on said blind type cover;
providing at least some of said components as sensors for sensing said activating element, whereby said blind cover moves relative to said printed circuit upon movement of said shifter rod allowing movements of said shifter rod to be sensed by said sensors.

19. A manufacturing process comprising the steps of:
providing a thermoplastically deformable printed circuit board in a flat state, the printed circuit board being provided with conductor strips;
applying solder to the rigid thermoplastically deformable printed circuit board in the flat state;
positioning components on the printed circuit board;
providing a frame having a curved surface providing a predetermined curvature;
clamping the printed circuit board, with the components inserted, to the frame by which said printed circuit board is statically molded to impart the predetermined curvature to said printed circuit board;
heating the clamped circuit board to a soldering temperature in a soldering furnace to thermoplastically deform said printed circuit board; and
cooling the printed circuit board to its solidification point whereby said printed circuit board maintains said predetermined curvature.

20. The process in accordance with claim 19, further comprising:
said soldering temperature is above said solidification point wherein said material softens at said soldering temperature.

21. The process in accordance with claim 19, wherein:
said printed circuit board is formed of a material undergoing stress during said clamping into said curved state, said stress being removed from said material during said heating.

22. The process in accordance with claim 19, wherein:
said material is glass fiber-reinforced epoxy resin.

23. The process in accordance with claim 19, further comprising:
providing a blind cover and a movable shifter rod of a shifting device, said blind cover being movable with said shifter rod;
inserting said printed circuit board in said curved state adjacent said blind cover of a shifting device.

24. The process in accordance with claim 19, further comprising:
providing an activating element on said blind type cover;
providing at least some of said components as sensors for sensing said activating element, whereby said blind cover moves relative to said printed circuit upon movement of said shifter rod allowing movements of said shifter rod to be sensed by said sensors.

* * * * *

UNITED STATES PATENT AND TRADEMARK OFFICE
CERTIFICATE OF CORRECTION

PATENT NO.      : 6,305,075 B1
DATED           : October 23, 2001
INVENTOR(S)     : Ersoy et al.

It is certified that error appears in the above-identified patent and that said Letters Patent is hereby corrected as shown below:

<u>Title page,</u>
Item [73], should read -- ZF Lemforder Metallwaren AG --

Signed and Sealed this

Thirtieth Day of July, 2002

*Attest:*

*Attesting Officer*

JAMES E. ROGAN
*Director of the United States Patent and Trademark Office*